July 26, 1960  E. E. SLADE  2,946,928
CIRCUIT BREAKER PANELBOARD
Filed Sept. 30, 1957  2 Sheets-Sheet 2

INVENTOR.
EUGENE E. SLADE
BY Robert T. Casey
ATTORNEY

United States Patent Office 2,946,928
Patented July 26, 1960

2,946,928

CIRCUIT BREAKER PANELBOARD

Eugene E. Slade, Bristol, Conn., assignor to General Electric Company, a corporation of New York Filed Sept. 30, 1957, Ser. No. 686,930

7 Claims. (Cl. 317—119)

My invention relates to electric circuit breaker panelboards, and particularly to panelboards adapted for use with circuit breakers of the plug-in type.

Circuit breaker panelboards adapted to receive circuit breakers of the plug-in mounted type in the past have ordinarily included blocks of insulating material such as molded insulating bases as the primary insulating and supporting means for the bus bars and circuit breakers. Such insulating molded blocks are relatively expensive and different types of such blocks are required for panelboards intended for different applications such for instance as single phase and three phase electrical systems.

Panelboards of the type referred to according to the prior art have also been limited as to the amount of current which can safely be carried thereby because of excessive temperature rise at localized areas therein. Heat is generated in such panelboards by the resistance of the main bus bars, by the resistance of the plug-in type contact between the circuit breakers and the bus bars, and also by the circuit breakers themselves which incorporate spring-pressed contacts as well as thermal heating elements for over current protection. Circuit breaker panelboards of the prior art type have suffered a cumulative heating effect from each of these sources resulting in high heat build-up within the panelboard. This is aggravated by the fact that the construction of such panelboards does not permit the ready diffusion and distribution of such heat throughout the panelboard enclosure and particularly into contact with outside walls, which afford the only significant means for dissipating such heat to the outside air.

Circuit breaker panelboards of the plug-in type according to the prior art have also been such as to render the connection between the branch straps and the main bus bars inaccessible for inspection and tightening when the circuit breakers are in place.

It is an object of my invention to provide a circuit breaker panelboard adapted to receive circuit breakers of the plug-in mounted type which does not require expensive insulating parts and which utilizes a minimum amount of insulating material.

It is another object of my invention to provide a circuit breaker panelboard of the type described which provides for ventilation and cooling of the main bus bars, the circuit breakers, and the connections between the circuit breakers and the bus bars and the diffusion and distribution of heat equally throughout the panelboard.

It is a further object of my invention to provide a circuit breaker panelboard of this type in which the connections between branch straps and the main bus bars are accessible for inspection and tightening without removing any circuit breakers.

It is another object of my invention to provide a panelboard including plug-in type circuit breakers in which the breakers are individually accessible for easy removal or replacement.

In accordance with the invention, I provide an electric circuit breaker panelboard comprising two spaced-apart rows of circuit breakers, and a plurality of main bus bars supported in parallel relation in the space therebetween. The circuit breakers are connected to the main bus bars by transverse branch connecting straps, which in turn are connected to the bus bars in the central area by means accessible from the front of the panel. The bus bar assembly is supported by two insulating members mounted on the main supporting member parallel to and on either side of the group of main bus bars and adapted to support the opposed ends of the branch connecting straps. The circuit breakers are supported at one end by their plug-in engagement with the ends of the branch connecting straps, and at the other end by inturned lugs carried by an upstanding wall of the main supporting member. Thus the circuit breakers, the main bus bars, and the branch connecting straps are all in effect suspended in air by supporting means which engages these components at localized points only, thus permitting the free flow of air around them and the diffusion and equalization of temperatures throughout the panelboard.

In accordance with another aspect of the invention, the branch connecting straps comprise strap-like conductors having the end portions thereof twisted at ninety degrees with respect to the main portion thereof whereby to present a contacting surface at right angles to the plane of the supporting member.

The insulating members, in accordance with this aspect of the invention, each comprise a plate or series of plates of relatively thin material, mounted in edgewise relation to the plane of the main supporting member and having openings therein to receive the end portions of the branch connecting straps. The openings are oriented to conform to the twisted ends of the branch connecting straps, which arrangement has the effect of positioning the branch connecting straps and the main bus bars between such insulating members and preventing substantial sidewise movement thereof.

Additional objects and advantages of my invention will be set forth in the following detailed description and the scope of my invention will be defined in the appended claims.

In the accompanying drawing.

Figure 2:
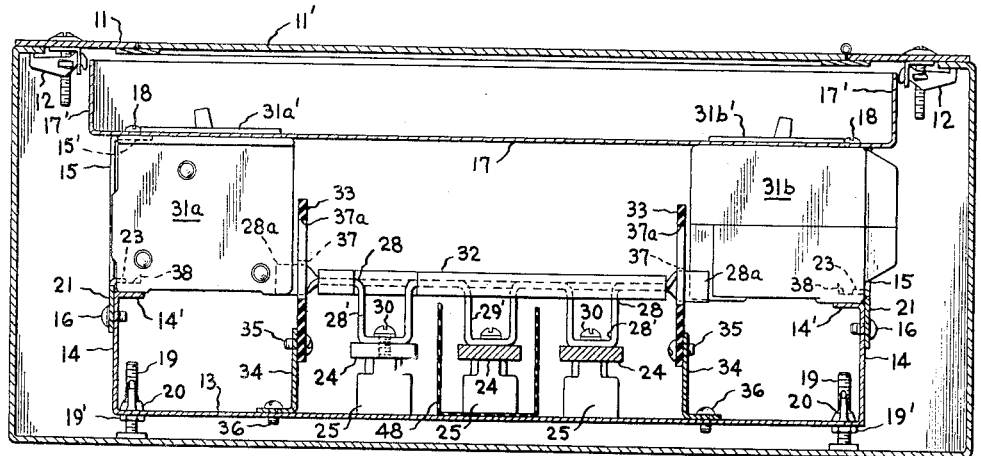
Figure 2 is an elevation view of the panelboard of Figure 1 taken on the line 2—2 of Figure 1 but showing the front closure in place.
Figure 3:
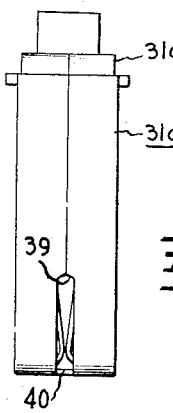
Figure 3 is an end elevation view of one circuit breaker utilized in the panelboard of Figure 1.

In the drawing, I have shown my invention as embodied in an electric circuit breaker panelboard comprising a main boxlike enclosure 10 having front closure means comprising a front cover 11 having an openable door 11' (see Fig. 2). The front cover 11 is attached to the box 10 by suitable means such as by clamps 12. Mounted within the box 10 is a supporting plate 13 having two opposed side wall portions 14 bent up at right angles to the main portion thereof and terminating in inwardly directed flanges 14'. Four supporting brackets 15 are provided, attached to the opposed side wall portions of the plate 13 by suitable means such as by screws or rivets 16 and terminating in inwardly directed flanges 15'. An inner cover plate or "trim" plate 17, having a peripheral wall or flange 17', is supported on the brackets 15 by means of screws 18. The mounting plate 13 is adjustably supported on the back wall of the box 10 by suitable means such as by threaded studs 19 having backing or stop nuts 19' for limiting the inward travel of the base of the plate 13, and wing type lock nuts 20 adapted to clamp the supporting plate 13 thereon. For the purpose of releasably retaining the ends of the circuit breakers in a manner to be described, there are provided retaining strips 21 attached to the upwardly bent side wall portions 14 of the mounting plate 13 by suitable means such as by screws or rivets 22. The strips 21 are preferably constructed of strong thin material such as spring steel and include inwardly directed spaced lug portions 23 adapted to cooperate with the circuit breakers in a manner to be described. If desired, of course, I may make the lugs 23 integral with the walls 14 and omit the separate strips 21.

A plurality of main bus bars 24 are provided, in generally side-by-side parallel relation spaced away from the mounting plate 13, and each having a terminal end thereof mounted on an insulating block 25 with a connecting lug 26 connected thereto. The insulating blocks 25 are mounted on the mounting plate 13 by suitable means such as by screws 27.

The main bus bars 24 each have connected thereto a number of transverse branch connecting straps 28 and 29. The branch connecting straps 28 and 29 comprise generally flat elongated straps having portions 28' and 29' respectively offset from the plane of the major portion thereof and connected to one of the bus bars 24 by suitable means such as by screws 30. In order to provide contacting surfaces adapted to cooperate with contact receiving sockets in the circuit breakers 31a and 31b, the branch connecting straps 28 and 29 each have their opposite end portions 28a and 29a twisted ninety degrees with respect to the plane of the major portion of the strap in the manner of a "candy twist." The major portion of the branch connecting straps 28 and 29 are provided with insulating means such as insulating sleeves or tubing 32.

For the purpose of supporting the branch connecting straps as well as the inner ends of the circuit breakers 31a and 31b, I provide insulating and supporting means comprising four plates 33 of insulating material disposed along opposite sides of the group of bus bars 24. Each of the plates 33 is attached to a right-angle shaped supporting strip 34 by suitable means such as by rivets 35. The mounting strip 34 is attached to the back wall of the mounting plate 13 by suitable means such as by screws 36. The insulating and supporting plates 33 are provided with openings 37 therein conforming relatively closely to the outline of the end of the branch connecting straps 28 and 29, the strap ends projecting through the insulating plates 33. The plates 33 also include openings 37a between each adjacent pair of openings 37 to provide increased over-surface electrical clearance between adjacent contact portions of the straps 28 and 29.

The insulating supporting plates 33 are preferably of modular construction, each being adapted to support three bus bar ends. The plates 33 serve to support the cross connecting straps 28 and 29, and, through them, the main bus bars 24. The insulating plates 33 also serve to position the cross connecting straps 28 and 29 and through them the main bus bars 24 with regard to sidewise movement transversely of the length of the main bus bars. This is accomplished by the dimensions of the opening in the plates 33 and the twisted portion of the straps 28 and 29 adjacent thereto.

The circuit breakers 31a, 31b, each include a recessed portion 38 at the load end thereof, which is adapted to receive the end portion of a lug 23 to releasably retain the outer end of the circuit breaker on the panelboard. In assembling the circuit breakers on the panelboard, the circuit breaker is placed in position on the inwardly bent flange 14' of the side walls 14 with the lugs 23 projecting into the recess 38. This accurately positions and aligns the socket carried by the opposite or line end of the circuit breaker with the corresponding contact blade portion 28a or 29a of the branch connecting straps 28 or 29. The breaker may thereafter be rotated about the lugs 23 until the contact blade portions 28a and 29a enter and engage the contact receiving sockets of the circuit breaker.

The contact receiving socket of the circuit breaker is preferably provided with means for limiting the inward travel of a contact blade, such for instance as the abutment 39 provided by the termination of the contact blade receiving slot 40 in the end wall of the circuit breaker casing. Thus it will be observed that when the circuit breaker 31a, 31b is in fully mounted position, the load end thereof is supported by the inwardly directed flange 14' of the side walls 14 of the mounting plate 13. The opposite or line end is supported by the contact blade portions 28a and 29a of the branch connecting straps 28 and 29.

For the purpose of making a return or neutral connection, I provide a neutral bar indicated generally at 41 and including a conductive plate 42 having a plurality of contact screws 43 threaded therein, and including a main neutral conductor connecting lug 44. The neutral plate 41 is supported in insulated relation from the mounting plate 13 by suitable means such as by being mounted on insulating blocks 45 which are attached to the mounting plate 13 by screws 46, the plate 42 being attached to each of the blocks 45 by means of a screw 47 threaded into the plate 42 and having its head in an enlarged recess in the underside of each of the blocks 45.

Figure 1:
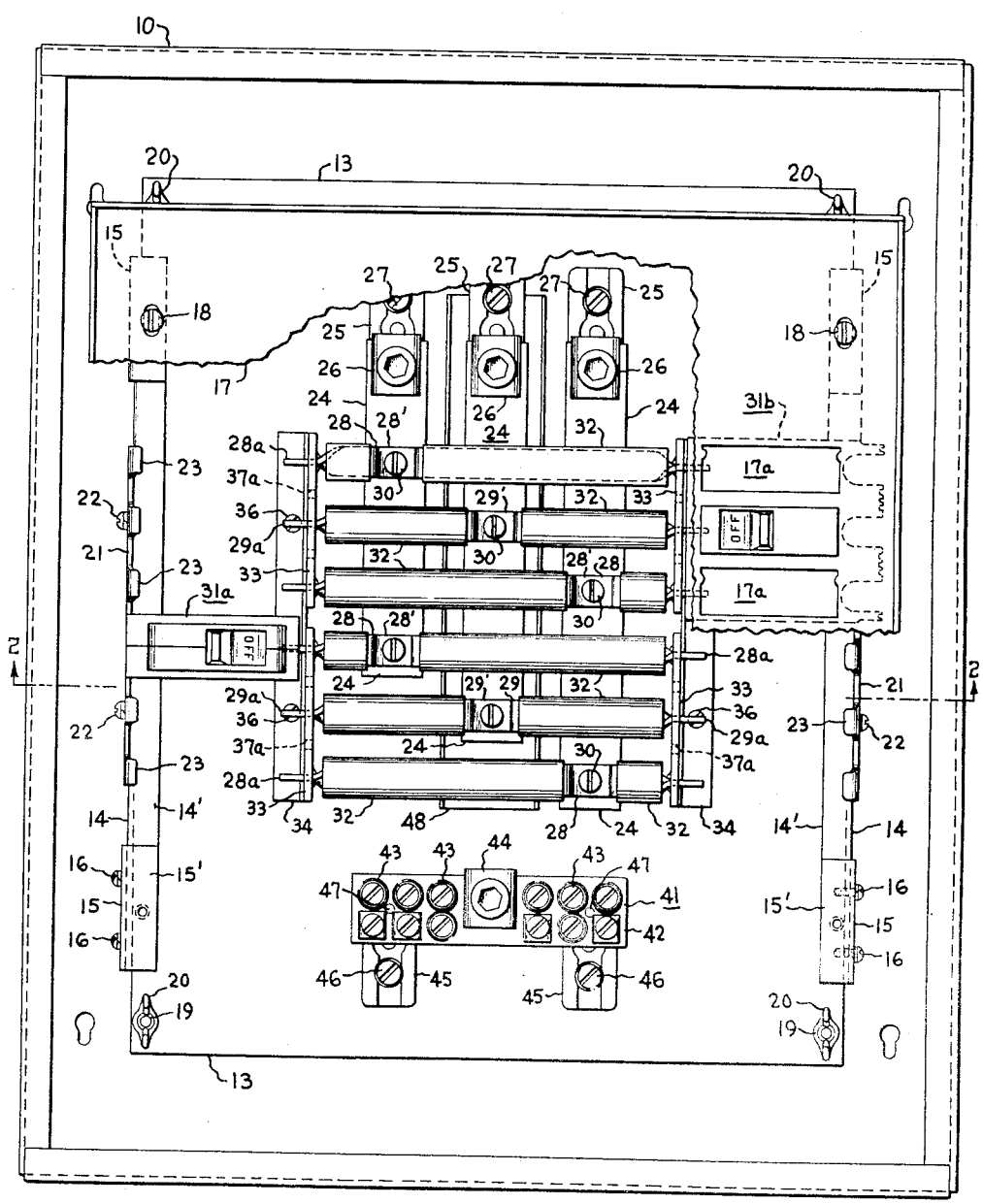
Figure 1 is a plan view of a circuit breaker panelboard embodying my invention, the front closure being omitted.

At 31a (Fig. 1) I have shown a single pole circuit breaker in mounted relation on the panelboard. It will be understood that single, two-pole, or three-pole circuit breakers may be mounted in the panelboard as desired. The panelboard is adapted to receive two and three pole circuit breakers, since the contact blades 28a and 29a are disposed in "sequence phase" relation. That is, any two adjacent branch connecting straps are connected to different ones of the main bus bars, and each three adjacent bus bar connecting straps are connected to three different bus bars. When all circuit breakers are mounted in place in the panelboard, there are provided two rows of circuit breakers which are spaced relatively widely apart, with the main bus bars and branch connecting straps almost entirely in the space therebetween.

The trim plate 17 has openings or knockouts 17a adapted to receive raised portions 31a', 31b' of the circuit breakers 31a and 31b so as to render the operating handles of the circuit breaker accessible for manual operation when the outer door of the cover is opened.

The main bus bars 24 are insulated from each other by means of an elongated generally U-shaped insulating member which is anchored to the back wall of the mounting plate 13 under the insulating block 25 and which includes opposed side portions extending between the central main bus bar and each of the outer main bus bars. This insulating member 48 is constructed of any suitable insulating material such for instance as vulcanized fiber. It will be observed that the insulating material used for insulating and supporting the main bus bars as well as the circuit breakers and the cross connecting straps comprise relatively inexpensive materials.

It will be observed that with the arrangements of my invention, an air space is provided behind each row of circuit breakers and extending in a vertical direction when the panelboard is mounted on the wall of a building as in the usual case. This permits a ready circulation of air to carry away any heat generated in the breakers themselves.

It will also be observed that the main bus bars 24 are located in a generally open central portion so that heat therefrom can readily be carried by circulating air as well as by radiation to both the front and back walls of the enclosure and thence dissipated to the outside air.

It will also be observed that when it is desired to insert, remove or change the circuit breakers after a panelboard has been put into use, it is only necessary to remove the outer closure 11 and the trim plate 17. When this is done, access may be had directly to the interior, to the circuit breakers, and to the cross connecting straps and their connections. Thus the connections between the cross connecting straps 28 and 29 and the main bus bars 24 may be readily inspected and tightened if necessary. In addition, because of the generous space provided between the two rows of circuit breakers, it is very easy to remove circuit breakers since both ends may be grasped directly with the hand and the breaker rotated about the retaining lugs 23.

It has been found that with panelboards constructed according to my invention, it is possible to utilize circuit breakers of maximum rating at all locations in the panelboard without excessive heat rise. This is believed to be because the heat is not trapped at its point of origin either in the circuit breakers, the plug-in contact areas, or the branch connecting strap to bus bar connecting areas. Instead, each of these areas is open to the direct flow of air currents which serve to remove heat from such "hot spots."

While I have disclosed only one embodiment of my invention, it will be appreciated that many modifications thereof may readily be made by those skilled in the art, and I therefore intend by the appended claims to cover all such modifications as fall within the true spirit and scope of my invention.

What I claim as new and desire to secure by Letters Patent of the United States is:

1. An electric panelboard comprising a generally planar main supporting member, two rows of electrical control devices mounted on said main supporting member in parallel spaced apart relation, a group of at least two main bus bars having one end thereof mounted on said main supporting member and extending in generally parallel relation to said rows of control devices in the space therebetween, a plurality of branch connecting straps, each extending transversely of and connected to one of said main bus bars and having each of its opposite ends connected to a corresponding one of said control devices, a pair of elongated insulating members mounted on said main supporting member generally parallel to and on either side of said group of main bus bars, said transverse branch connecting straps having their opposite ends supported by said insulating members respectively, the intermediate portions of said main bus bars being suspended from said branch connecting straps and spaced away from the main planar surface of said main supporting member.

2. An electric panelboard as set forth in claim 1 wherein said end portions of said branch connecting straps comprise contact portions and said electrical control devices include plug-in contact means making releasable plug-in connection directly with said contact portions.

3. An electric panelboard comprising a generally planar main supporting member, a plurality of main bus bars having one end thereof supported in insulated relation on said main supporting member, a plurality of branch connecting straps each having an intermediate wide flat surface portion connected to one of said main bus bars and extending parallel to the plane of said main supported member, said straps having their end portions collectively aligned in a direction parallel to said main bus bars, supporting means for said branch connecting straps and the major intermediate portion of said main bus bars comprising a plate of insulating material mounted in edgewise relation on said main supporting member on each side of said main bus bars and having openings therein, said end portions of said branch connecting straps being twisted ninety degrees with respect to the plane of said intermediate portion and extending through said openings, and a plurality of electric control devices disposed on the opposite side of said plate of said insulating material from said main bus bars and having a plug-in type electrical engagement with said end portions of said branch connecting straps.

4. An electric panelboard comprising a generally planar supporting member, at least four generally parallel upstanding wall portions mounted on said main supporting member and providing a generally central elongated mounting space and two outer elongated mounting spaces on either side of said central mounting space, a plurality of main bus bars extending in generally parallel relation in said central mounting space, a plurality of electric control devices mounted in a row in each of said outer mounting spaces, a plurality of transversely extending branch connecting straps within said central mounting space each connected to one of said main bus bars and having each of its ends adapted to be connected to one of said electric control devices in each of said outer mounting spaces, said wall portions defining said central mounting space providing the sole support for said transversely extending branch connecting straps and one end of said electric control devices, said wall portions defining the outer walls of each of said outer elongated mounting spaces providing the sole support for the other end of said electric control devices, the major intermediate portions of said main bus bars being supported by said transversely extending branch connecting straps away from the general plane of said main supporting member.

5. An electric panelboard comprising a generally planar main supporting member, a plurality of main bus bars having one end thereof supported in insulated relation on said main supporting member, a plurality of transversely extending branch connecting straps each having an intermediate portion connected to one of said main bus bars, said straps having their end portions aligned collectively in a direction parallel to said main bus bars, and supporting means for said branch connecting straps and the major intermediate portion of said main bus bars comprising a plate of insulating material mounted in edgewise relation on said main supporting member on each side of said main bus bars and having openings therein, said end portions of said branch connecting straps extending through said openings for connection to electric control devices positioned on the opposite side of said plate of insulating material from said bus bars, the electrical connection between said connecting straps and said bus bars providing the sole support for the major intermediate portions of said bus bars and spacing said bus bars from said supporting member.

6. An electric panelboard comprising a generally planar supporting member, a plurality of main bus bars extending in generally parallel relation and having one end thereof mounted in insulated relation on said main supporting member, a plurality of strap-like transversely extending branch connecting members having a wide flat surface portion intermediate the ends thereof disposed parallel to the plane of said supporting member and connected to one of said main bus bars, said branch connecting straps having their opposed end portions twisted at ninety degrees with respect to the plane of the wide face of the main portion thereof, insulating means supporting said end portions in spaced relation from the main surface of said main supporting member, and a plurality of electric control devices disposed in two rows at opposite sides of said main bus bars and each having a plug-in type engagement with one of said strap end portions, the major intermediate portions of said bus bars being supported between said plates of insulating material in spaced relationship from said supporting member by the electrical connections to said connecting straps.

7. An electric panelboard comprising, a generally planar supporting member; a pair of parallel support plates of insulating material upstanding from said supporting member defining a central space therebetween; a plurality of elongated branch connecting straps supported by said plates to extend transversely across said central space; a plurality of main bus bars extending within said central space in generally parallel relationship to said support plates, said bus bars being supported within said central space in spaced relationship to said supporting member and said support plates by and connected to respective ones of said connecting straps, whereby the connections between said bus bars and said connecting straps are suspended freely away from adjacent portions of said panelboard to permit the free circulation of air thereabout thereby promoting the diffusion and distribution of heat throughout said panelboard.

References Cited in the file of this patent

UNITED STATES PATENTS

| | | |
|---|---|---|
| 1,642,698 | Rohn | Sept. 20, 1927 |
| 2,165,203 | Albers | July 11, 1939 |
| 2,199,626 | Freese | May 7, 1940 |
| 2,251,403 | Frank | Aug. 5, 1941 |
| 2,351,942 | Dyer | June 20, 1944 |
| 2,717,339 | Brown | Sept. 6, 1955 |
| 2,737,613 | Morris | Mar. 6, 1956 |
| 2,790,113 | Brown | Apr. 23, 1957 |
| 2,883,587 | Dorfman | Apr. 21, 1959 |

OTHER REFERENCES

Bulldog Bull., June 1946, page 40.